US012593246B2

(12) United States Patent
Balasubramanian et al.

(10) Patent No.: US 12,593,246 B2
(45) Date of Patent: Mar. 31, 2026

(54) PREDICTIVE ARTIFICIAL INTELLIGENCE (AI)-BASED WIRELESS STATION LOAD BALANCING BASED ON ACCESS POINT UPLINK UTILIZATION

(71) Applicant: Fortinet, Inc., Sunnyvale, CA (US)

(72) Inventors: Karthikeyan Balasubramanian, Bangalore (IN); Venkatesh Kannan, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 320 days.

(21) Appl. No.: 18/375,444

(22) Filed: Sep. 29, 2023

(65) Prior Publication Data

US 2025/0113251 A1 Apr. 3, 2025

(51) Int. Cl.
*H04W 28/086* (2023.01)
*H04W 84/12* (2009.01)

(52) U.S. Cl.
CPC ........ *H04W 28/0861* (2023.05); *H04W 84/12* (2013.01)

(58) Field of Classification Search
CPC ............. H04W 28/08; H04W 28/0835; H04W 28/0838; H04W 28/0861; H04W 28/0958; H04W 84/12; H04W 28/0942; H04W 24/02
See application file for complete search history.

(56) References Cited

U.S. PATENT DOCUMENTS

| | | | |
|---|---|---|---|
| 2003/0210672 A1* | 11/2003 | Cromer ................... | H04L 47/11 370/468 |
| 2013/0121147 A1* | 5/2013 | Tapia .................... | H04L 1/0001 370/230 |
| 2013/0231099 A1* | 9/2013 | Meshkati ................ | H04W 8/22 455/418 |
| 2020/0266903 A1* | 8/2020 | De Rosa ............ | H04B 7/18506 |

* cited by examiner

*Primary Examiner* — Kan Yuen

(74) *Attorney, Agent, or Firm* — Law Office of Dorian Cartwright; Dorian Cartwright

(57) ABSTRACT

An uplink utilization is monitored for each station connected to an access point over a wireless network, including jitter, latency, and dropped packets. Uplink utilization is monitored for access points that are neighbors to the access point, as determined from neighbor reports. An AI model is generated from monitoring data. When an uplink threshold of the access point has been exceeded at the access point. A new access point is selected from the AI model for at least one of the stations based at least on a least used uplink in addition to RF parameters.

20 Claims, 5 Drawing Sheets

420

START

MONITOR UPLINK UTLIZATION FOR EACH STATION CONNECTED TO AN ACCESS POINT
510

MONTOR UPLINK UTILITZATION FOR NEIGHBORING ACCESS POINTS
520

GENERATE AI MODEL FROM MONITORING DATA
530

DETECT THAT AN UPLINK THRESHOLD HAS BEEN EXCEEDED
540

SELECT A NEW ACCESS POINT USING THE AI MODEL BASED ON LEAST USED UPLINK
550

TO 430

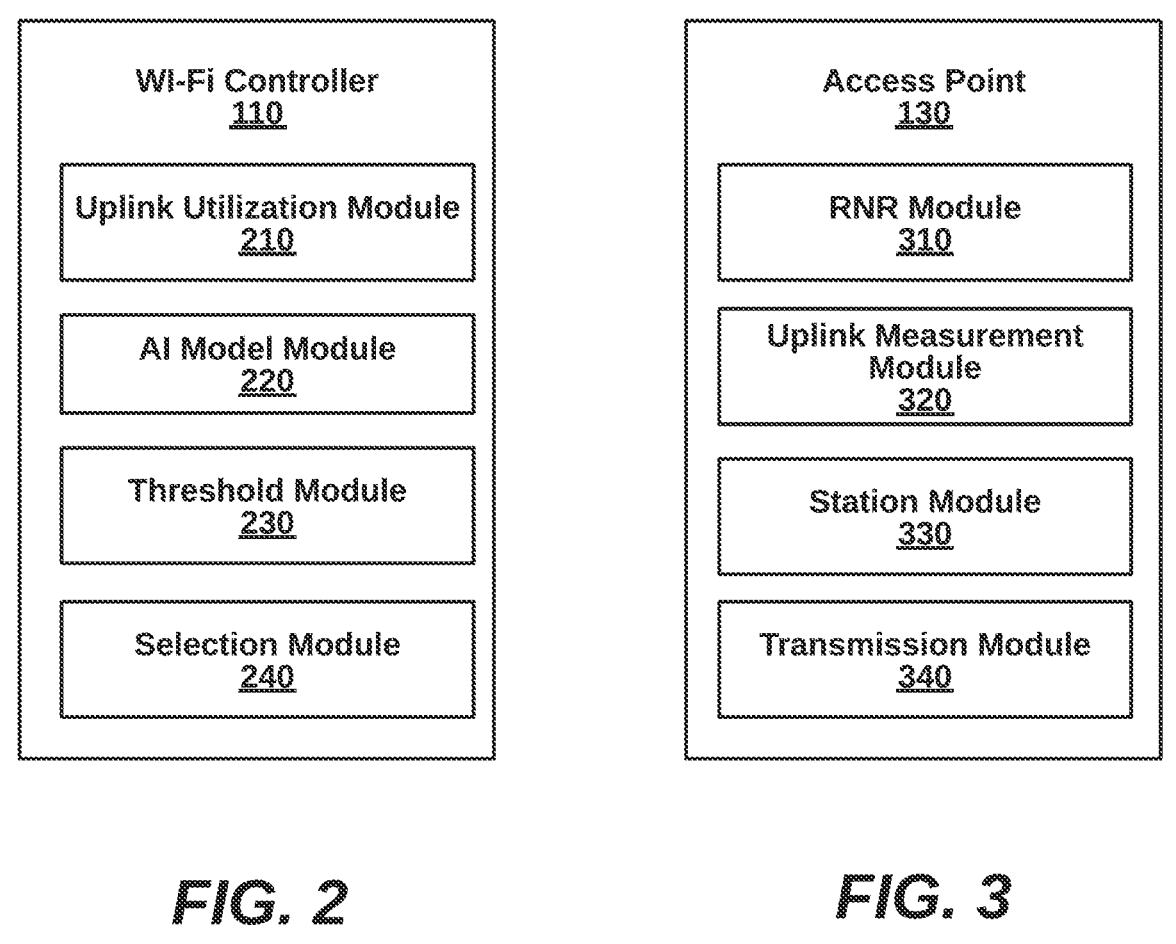

WI-Fi Controller
110

Uplink Utilization Module
210

AI Model Module
220

Threshold Module
230

Selection Module
240

*FIG. 2*

Access Point
130

RNR Module
310

Uplink Measurement Module
320

Station Module
330

Transmission Module
340

PREDICTIVE ARTIFICIAL INTELLIGENCE (AI)-BASED WIRELESS STATION LOAD BALANCING BASED ON ACCESS POINT UPLINK UTILIZATION

FIELD OF THE INVENTION

The invention relates generally to computer networks, and more specifically, for artificial intelligence (AI)-based wireless station load balancing based on access point uplink utilization.

BACKGROUND

The next generation of access points and stations using Wi-Fi 6E and Wi-Fi 7 operate at relatively high speeds, causing new stresses on wireless systems. Generally, stations connect to access points to transmit data uplink and to receive data. In an HD environment, indoor stadium or university classroom scenario where in all the students and teachers or stadium users, using apps like Netflix, Amazon or YouTube, are heavy bandwidth users. Apps can viewing 4k/8k UHD videos (30 fps UHD service requires 40 Mbps of bandwidth, and the upcoming 60 fps UHD service would require 80 Mbps) and 1080p (1080p @30 fps requires 12 Mbps) so that there is very high chance that the uplink gets utilized more than 5 Gbps with just 50 STAs connected to an access point.

In existing implementations, stations roam from an existing BSS ID to a better one is based on number of factors, such as current RSSI, SNR, beacon misses and RF conditions like retry count, Channel Utilization, station load count in the QBSS info IE, and the like. Most of the time, roam decisions are made on the station side. Occasionally roam decision is assisted by access points, using 802.11k/802.11v Neighbors Report Responses.

Problematically, stations typically make roaming decision based only from the best radio frequency (RF) perspective between the station and access points. Besides that, the roaming to the best possible RF parameters alone does not yield the best user experience as there can be a situation that the uplink of the access points can be worst (with circumstances like link flapping, failures etc. or over utilized links).

What is needed is a robust technique for AI-based wireless station load balancing based on access point uplink utilization.

SUMMARY

To meet the above-described needs, methods, computer program products, and systems in AI-based wireless station load balancing based on access point uplink utilization.

In one embodiment, uplink utilization is monitored for each station connected to an access point over a wireless network, including jitter, latency, and dropped packets. Uplink utilization is monitored for access points that are neighbors to the access point, as determined from neighbor reports. An AI model is generated from monitoring data.

In another embodiment, when an uplink threshold of the access point has been exceeded at the access point. A new access point is selected from the AI model for at least one of the stations based at least on a least used uplink in addition to RF parameters.

Advantageously, computer networking is improved with more network traffic.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a Wi-Fi controller of the system of FIG. 1, according to one embodiment.

FIG. 3 is a block diagram illustrating an access point of the system of FIG. 1, according to an embodiment.

DETAILED DESCRIPTION

Methods, computer program products, and systems for AI-based wireless station load balancing based on access point uplink utilization. One of ordinary skill in the art will recognize many alternative embodiments that are not explicitly listed based on the following disclosure.

I. Systems for Uplink Utilization Management (FIGS. 1-3)

Figure 1:
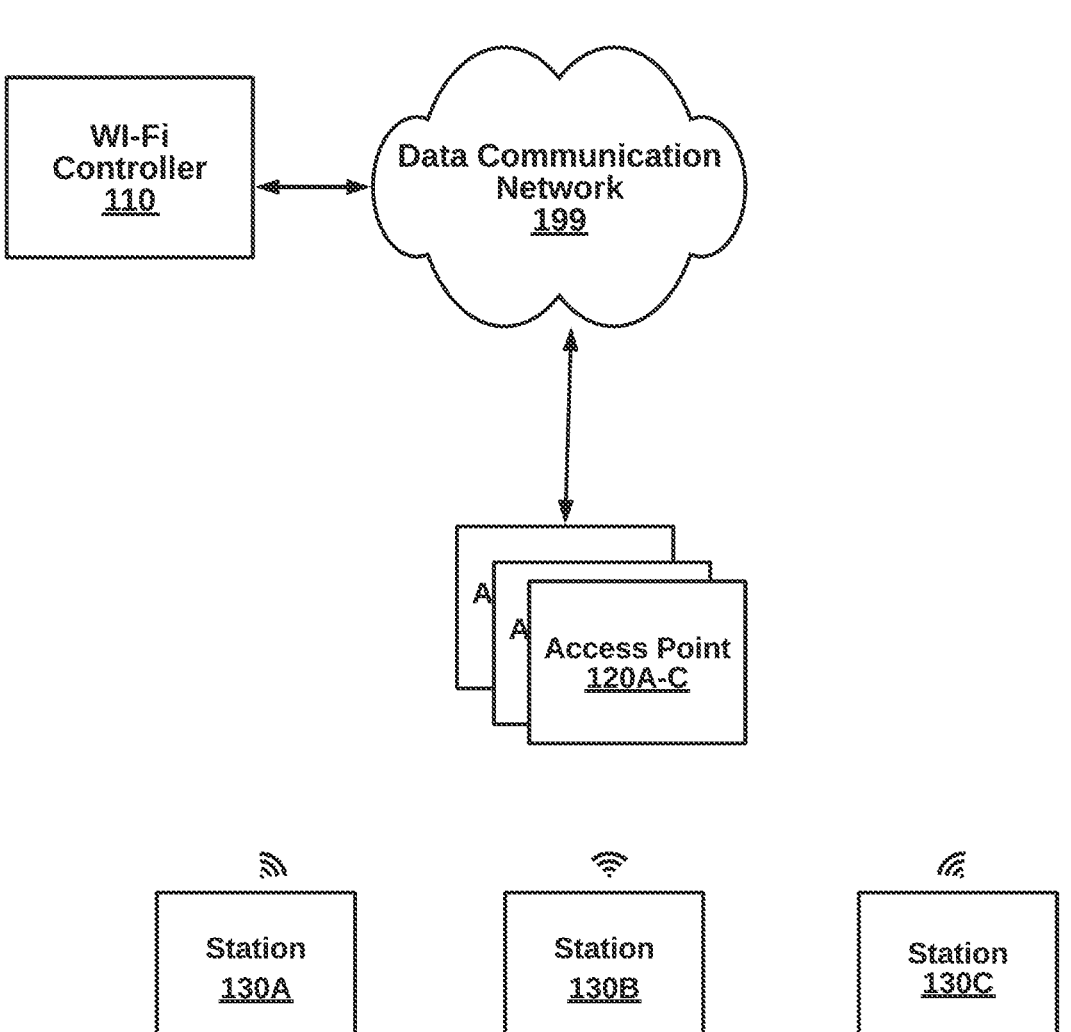
FIG. 1 is a high-level block diagram illustrating a network system for AI-based wireless station load balancing based on access point uplink utilization, according to one embodiment.

FIG. 1 is a high-level block diagram illustrating a network system 100 for AI-based wireless station load balancing based on access point uplink utilization, according to one embodiment. The network system 100 includes a Wi-Fi controller 110, access points 120A-c and stations 130A-C. Other embodiments of the system 100 can include additional components that are not shown in FIG. 1, such as controllers, network gateways, routers, switches, additional access points and wired or wireless stations. Many variations are possible. The components are implemented in hardware, software, or a combination of both, as shown in the example below of FIG. 6.

The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks. The Wi-Fi controller 110 can be coupled to a data communication network 199 such as a private network connected to the Internet. The access points 120A-C can be connected to the data communication system 199 both via hard wire (e.g., Ethernet) through an access point and/or a gateway device. The stations 130A-C can be wirelessly connected to the data communication system 199. In FIG. 1, station 130A is wirelessly coupled to access point 120A, station 130B is wirelessly coupled to access point 120B and station 130C is wirelessly coupled to access point 130B, for the sake of an example used herein. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPV4 or IPV6 address spaces.

The Wi-Fi controller 110, in an embodiment, monitors uplink utilization across access points 120A-C, and makes adjustments using an AI model for load balancing. AI ops can collect solicited bandwidth feedback scores at regular intervals and update a neighbor table for access points, in order to derive a baseline. Specifically, AI ops monitor bandwidth utilization of Ethernet backhaul, latency and jitter, link flap counts, and client roam history.

Currently, the wireless station steering algorithm implementation does not consider the access point uplink capacity (5G or 2.5 Gbps or 1 Gbps), utilization and quality or stability. Besides that, there is no correlation between the best RF neighbor and the wired uplink parameters. However, the Wi-Fi controller 110 load balances based on, for example, an access point with the least uplink utilization. Additionally, sticky client steering, and 6G band steering from 2.4 GHZ, 5 GHZ and 6 GHz can be forced to an access point with the least uplink utilization.

To do so, IEEE 802.11 open authentication and association are suppressed from access points with heavy uplink utilization. For example, probe responses are sent from the access point 120B instead of the access point 120A even when RF conditions are best at the access point 120A. If a station nonetheless connects to the access point 120A by skipping probes, an 802.11v neighbor report response is sent with the access point 120B as the best possible candidate with a dissociation imminent bit is set.

In another case, when the access point 120A uplink saturation is more than an AI derived baseline, existing wireless clients can be handed off. A station that needs to be steered is selected based on stations that do not use VOIP or video stations. Neighbor reports are sent and the access point 120B saturation is monitored.

In a case in which an access point is set up as a mesh, the access point 120A and the access point 120B can be root nodes and the access point 120C can be a mesh client. The mesh client is steered from an overutilized mesh node to a better mesh node.

The access points 120A-C steers stations according to uplink load balancing. In some embodiment, the access points 120A-C are Wi-Fi 6E access points or Wi-Fi 7 access points, along with legacy access points. In some cases, the access points 120A-C are also involved in access point selection in combination with the Wi-Fi controller, particularly in embodiments in which an access point has neighboring access point utilization.

The stations 130A-C wirelessly transmit uplink to access points, according to AI load balancing. Data is also received from access points downlink. Modifications to the stations 130A-C to implement the uplink management are not required in preferred implementations. Other implementations can download a daemon or app for enhanced features of uplink management, such as real-time queue measurement for use in a load balancing algorithm. Additionally, the stations 130A-C may roam from access point to access point on their own or be forcibly handed off, an uplink allocation can be updated per conditions of new access point. However, uplink allocation can be maintained when based more heavily on conditions of the device itself rather than based on conditions of the access points.

FIG. 2 is a more detailed block diagram illustrating the Wi-Fi controller 110 of FIG. 1, according to an embodiment. The Wi-Fi controller 110 includes an uplink utilization module 210, an AI model module 220, a threshold module 230, and a selection module 240. Components can be implemented in software and/or software. Many other variations of components are possible.

The uplink utilization module 210, in an embodiment, monitors uplink utilization for each station connected to an access point over a wireless network, including jitter, latency, and dropped packets. The uplink utilization module monitors uplink utilization for access points that are neighbors to the access point, as determined from neighbor reports.

The AI model module 220 can generate an AI model from monitoring data. Historical data is collected over time in a database. In some embodiments, statistical modeling is used.

The threshold module 230 can detect that an uplink threshold of the access point has been exceeded at the access point. The selection module 240 uses the AI model to select a new access point for at least one of the stations based at least on a least used uplink in addition to RF parameters (e.g., RSSI).

FIG. 3 is a more detailed block diagram illustrating the access point 120 (representative of access points 120A-C) of FIG. 1, according to an embodiment. The access point 120 includes an uplink utilization module 210, an AI model module 220, a threshold module 230, and a transmission module 240. Components can be implemented in software and/or software. Many other variations of components are possible.

II. Methods for Uplink Utilization Management (FIGS. 4-5)

Figure 4:
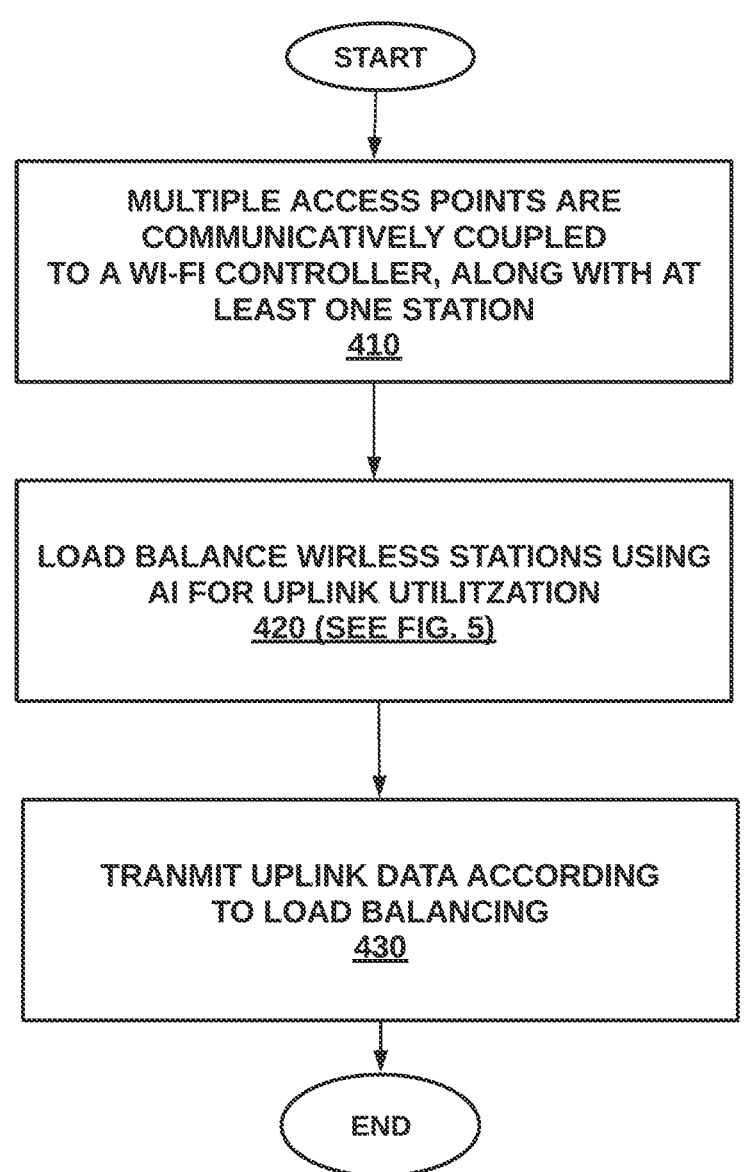
FIG. 4 is a high-level flow chart for AI-based wireless station load balancing based on access point uplink utilization, according to an embodiment.

FIG. 4 is a high-level flow diagram illustrating a method 400 for AI-based wireless station load balancing based on access point uplink utilization, according to an embodiment. The method 400 can be implemented by, for example, system 100 of FIG. 1.

At step 410, a plurality of access points is communicatively coupled to a Wi-Fi controller. The access points, in turn, wirelessly connect to stations exchanging data with the backbone network. At step 420, AI-based wireless stations are load balancing based on access point uplink utilization. At step 430, the stations transmit uplink data according to the load balancing.

Figure 5:
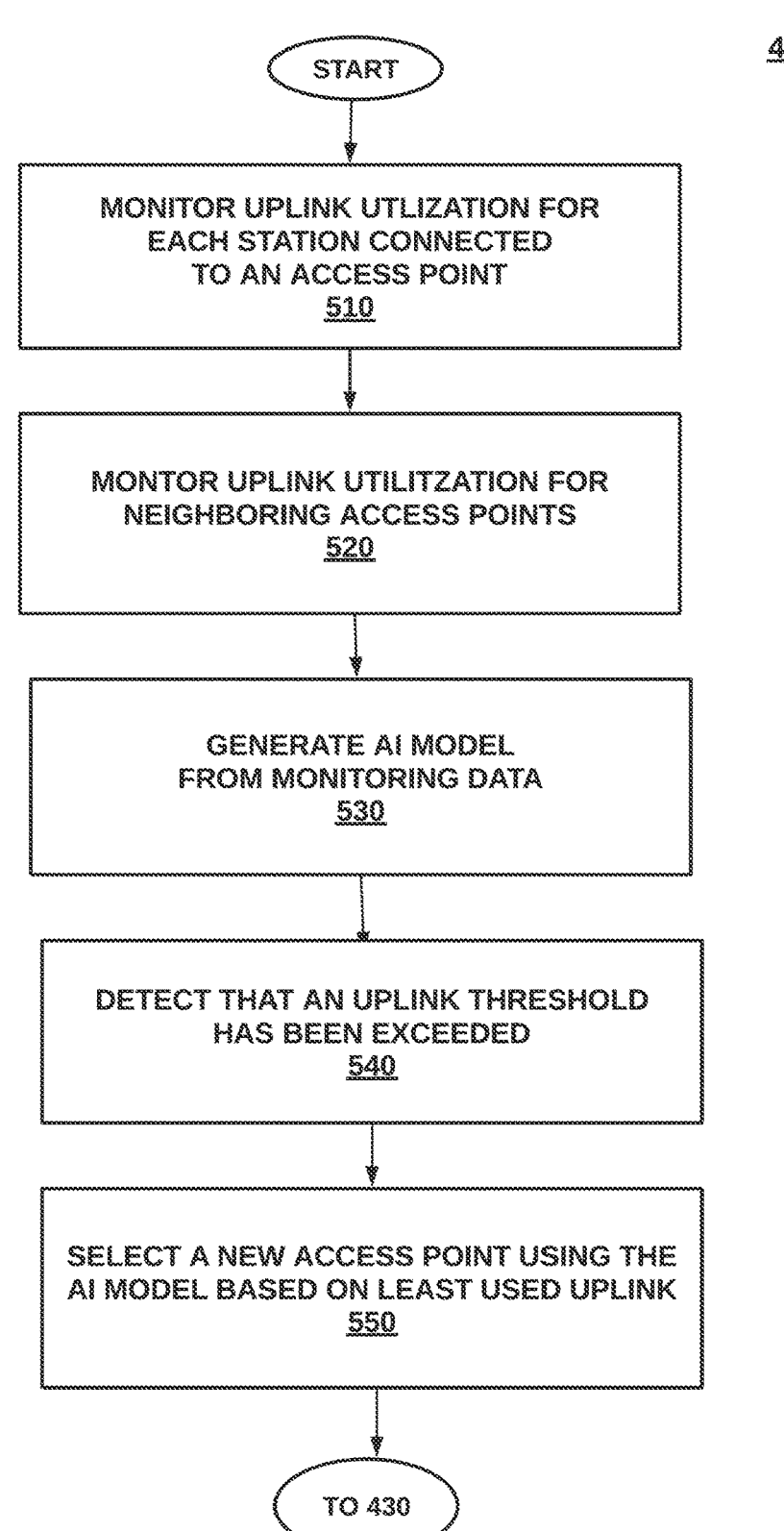
FIG. 5 is a more detailed flow chart for a step of AI-based wireless station load balancing based on access point uplink utilization, from the method of FIG. 4, according to one embodiment.

A more detailed example of step 420 for AI-based wireless station is load balanced based on access point uplink utilization, is shown in FIG. 5, according to one embodiment. At step 510, uplink utilization is monitored for each station connected to an access point over a wireless network, including jitter, latency, and dropped packets. At step 520, uplink utilization is monitored for access points that are neighbors to the access point, as determined from neighbor reports. At step 530, an AI model is generated from monitoring data. Because uplink utilization of neighbors is available to each access point, the uplink utilization load balancing can also be performed locally by access points. A Wi-Fi controller with network-wide visibility lends to additional factors for selection.

At step 540, when an uplink threshold of the access point has been exceeded at the access point, at step 550, a new access point is selected from the AI model for at least one of the stations based at least on a least used uplink. In other implementations, RF parameters and other factors result in a selection other than the least used uplink.

III. Computing Device for Uplink Utilization Management (FIG. 6)

Figure 6:
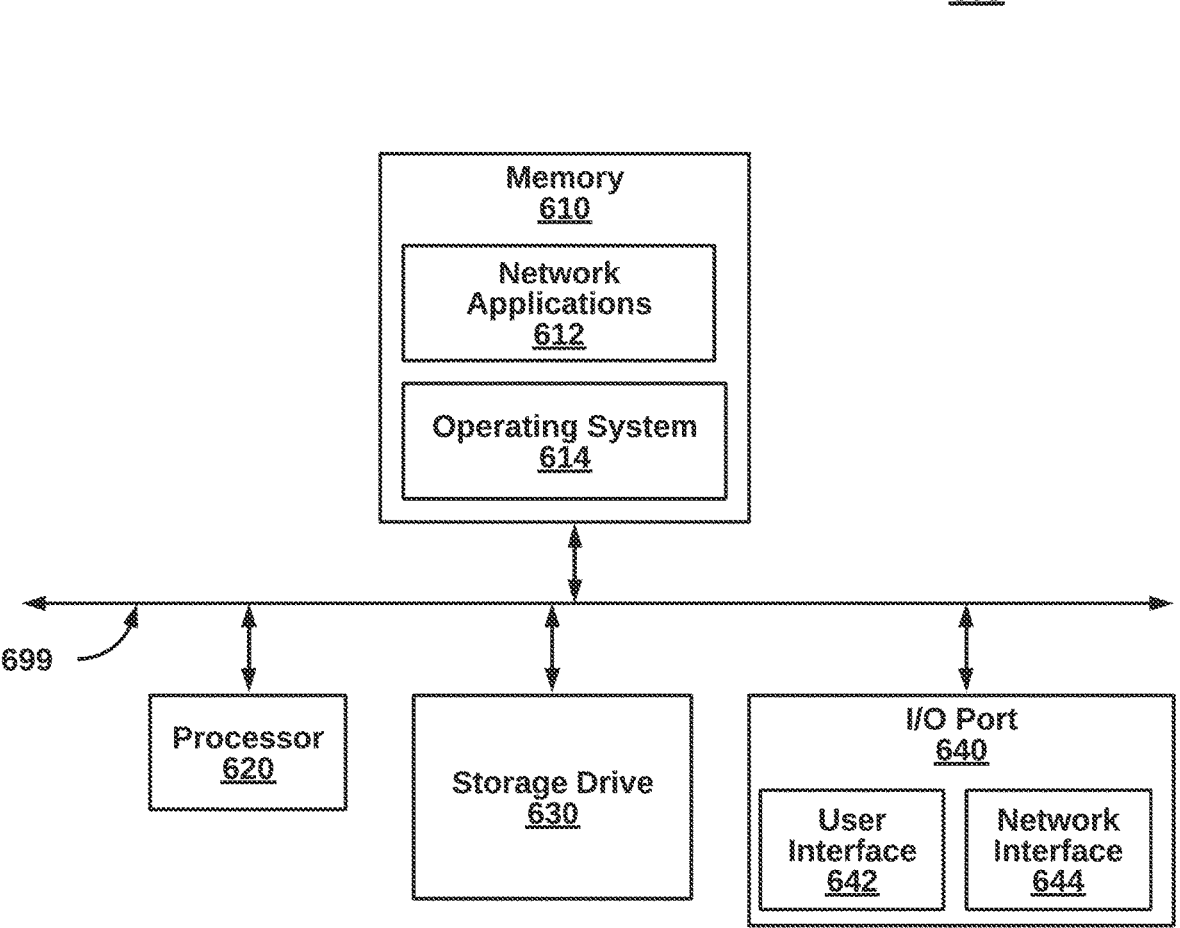
FIG. 6 is a block diagram illustrating an example computing device implementing the network system of FIG. 1, according to one embodiment.

FIG. 6 is a block diagram illustrating a computing device 600 implementing the packet processor 100 of FIG. 1, according to one embodiment. The computing device 600 is a non-limiting example device for implementing each of the components of the system 100, including the Wi-Fi controller 110, the access points 120A-C and the stations 130A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a Wi-Fi network device for Artificial Intelligence (AI)-based wireless station load balancing based on access point uplink utilization, the method comprising the steps:

monitoring uplink utilization for each station connected to an access point of a plurality of access points over a wireless network, including jitter, latency, and dropped packets;

monitoring uplink utilization for access points from the plurality of access points that are neighbors to the access point, as determined from neighbor reports;

generating an AI model of uplink utilization for the plurality of access points from monitoring data;

detecting that an uplink threshold of the access point has been exceeded at the access point; and selecting, using the AI model, a new access point from the plurality of access points for at least one of the stations based at least on a least used uplink in addition to Radio Frequency (RF) parameters.

2. The method of claim 1, wherein the Wi-Fi network device is a Wi-Fi controller.

3. The method of claim 1, wherein reduced neighbor reports (RNR) are received from the plurality of access points.

4. The method of claim 1, wherein the RF parameters comprise radio signal strength indicator (RSSI).

5. The method of claim 1, wherein at least one of the plurality of stations is forced to a different one of the plurality of access points indicating lower uplink utilization.

6. The method of claim 1, wherein responsive to a heavy uplink utilization, suppressing probe responses.

7. The method of claim 1, wherein the Wi-Fi network device comprises a root access point and the plurality of access points comprises root access points.

8. A non-transitory computer-readable medium storing computer-readable instructions in a Wi-Fi network device on a data communication network, that when executed by a processor, perform a method for Artificial Intelligence (AI)-based wireless station load balancing based on access point uplink utilization, the method comprising:

monitoring uplink utilization for each station connected to an access point over a wireless network, including jitter, latency, and dropped packets;

monitoring uplink utilization for access points that are neighbors to the access point, as determined from neighbor reports;

generating an AI model from monitoring data;

detecting that an uplink threshold of the access point has been exceeded at the access point; and selecting, from the AI model, a new access point for at least one of the stations based at least on a least used uplink in addition to RF parameters.

9. The method of claim 8, wherein the Wi-Fi network device is a Wi-Fi controller.

10. The method of claim 8, wherein reduced neighbor reports (RNR) are received from the plurality of access points.

11. The method of claim 8, wherein the RF parameters comprise radio signal strength indicator (RSSI).

12. The non-transitory computer-readable medium of claim 8, wherein at least one of the plurality of stations is forced to a different one of the plurality of access points indicating lower uplink utilization.

13. The non-transitory computer-readable medium of claim 8, wherein responsive to a heavy uplink utilization, suppressing probe responses.

14. The non-transitory computer-readable medium of claim 8, wherein the Wi-Fi network device comprises a root access point and the plurality of access points comprises root access points.

15. A Wi-Fi network device for Artificial Intelligence (AI)-based wireless station load balancing based on access point uplink utilization, the Wi-Fi network device comprising:

a processor;

a network communication interface, communicatively coupled to the processor and to the data communication network; and a memory, communicatively coupled to the processor and storing source code executed by the processor, comprising:

an uplink utilization module to monitor uplink utilization for each station connected to an access point over a wireless network, including jitter, latency, and dropped packets, wherein the uplink utilization module monitors uplink utilization for access points that are neighbors to the access point, as determined from neighbor reports;

an AI model module to generate an AI model from monitoring data;

a threshold module to detect that an uplink threshold of the access point has been exceeded at the access point; and a selection module to select, from the AI model, a new access point for at least one of the stations based at least on a least used uplink in addition to RF parameters.

16. The device of claim 15, wherein the Wi-Fi network device is a Wi-Fi controller.

17. The device of claim 15, wherein reduced neighbor reports (RNR) are received from the plurality of access points.

18. The device of claim 15, wherein the RF parameters comprise radio signal strength indicator (RSSI).

19. The Wi-Fi network device of claim 15, wherein responsive to a heavy uplink utilization, suppressing probe responses.

20. The Wi-Fi network device of claim 15, wherein the Wi-Fi network device comprises a root access point and the plurality of access points comprises root access points.

* * * * *